United States Patent Office 3,410,807
Patented Nov. 12, 1968

3,410,807
SOLUTIONS CONTAINING NOBLE
METAL COMPOUNDS
William G. Lloyd, Dover, N.J., assignor to The Lummus
Company, New York, N.Y., a corporation of Delaware
No Drawing. Continuation-in-part of application Ser. No.
391,005, Aug. 20, 1964. This application Feb. 9, 1967,
Ser. No. 614,788
10 Claims. (Cl. 252—429)

ABSTRACT OF THE DISCLOSURE

Stable, homogeneous solutions of compounds of Group VIII noble metals, mono- or poly-hydric alcohols and 0.1–12 percent (volume) of water are suitable for catalytic oxidation of compounds including olefins, aromatic hydrocarbons, carbon monoxide and sulfur dioxide. Processes for so oxidizing CO to organic carbonates and $SO_2$ to organic sulfates.

---

This application is a continuation-in-part of my application Ser. No. 391,005, filed Aug. 20, 1964, and now abandoned; of applications filed July 23, 1965, namely, Ser. No. 474,460, 474,461 and 474,506, each of which is a continuation-in-part of Ser. No. 391,005; and of Ser. No. 534,419, filed Mar. 15, 1966.

This invention relates to solutions containing noble metal compounds. More specifically, it has to do with stable, homogeneous solutions having catalytic activity for a plurality of chemical reactions.

The catalytic activity of the Group VIII metals has been long recognized and many catalysts containing these metals are used commercially in, for example, hydrogenation and oxidation processes. Their activity has been ascribed to the ability of these metals to form coordinate covalent bonds with various organic reactants and to their labile valence structure. The former property gives rise to chemisorption while the latter gives rise to single electron transfer activation of, for example, $H_2$ and $O_2$.

Such catalysts are, however, costly, not only because the noble metals per se are rare, but also because in the metallic form only a tiny fraction of the metal is catalytically active. That fraction of the metal which is active must first of all be on the surface of the solid catalyst. Since reactants do not have access to deep lying atoms in the metal structure, they are replaced by less costly materials, i.e., supports. Nevertheless, even with a noble metal layer a few atoms deep, only those atoms whose valences are "unsaturated" by adjacent atoms exert catalytic activity. Thus, the density of so-called "active sites" is relatively low. Furthermore, these sites are subject to poisoning not only by irreversible adsorption of various materials but also by the annealing effect that is inevitable at the high temperatures at which such catalysts are used. The need for these high temperatures, of course, results from the relatively poor activity of massive solid catalysts which has its origin in the reasons just outlined.

Atomic level dispersions suitable for catalysis can be made by dissolving salts of the appropriate Group VIII metals in a liquid medium. The reaction to be catalyzed would then be conducted in this medium. Both the reactants and the catalyst salt must, therefore, be soluble in the medium. Water has been used as a medium in, for example, the process in which olefins are oxidized to carbonyl compounds in the presence of palladium salts. However, water has many serious drawbacks. Not only are organic materials and simple palladium salts sparingly soluble in it, but palladium II salts are hydrolyzed to insoluble oxides and hydroxides.

A common arttifact to overcome the lack of solubility of transition metal salts in water is to add solubilizing agents which are materials capable of forming complex ions with the metal. Thus, a homogeneous aqueous solution 0.001 M in $PdCl_2$ can be made if the solution is also made 0.002 M in LiCl. ("M" signifies gram-moles per liter). Even this solution, however, deposits a sludge in three hours at room temperature, as a result of hydrolysis, for example:

$Pd(H_2O)_2Cl_2 + H_2O \rightleftharpoons Pd(H_2O)_3Cl^{(+)} + Cl^{(-)}$
$Pd(H_2O)_3Cl^{(+)} + H_2O \rightarrow Pd(H_2O)_2(OH)Cl + H_3O^{(+)}$ Although such precipitation can be retarded by operating in an acidic environment, so doing greatly increases corrosion problems.

Although it is reasonable to expect that aqueous solubility can also be increased by use of high proportions of complexing materials, it is not so obvious a priori that the resulting solutions have poor catalytic activity. It is thought that this situation arises because the solubilizing agents pre-empt those coordination sites which are normally occupied by water prior to hydrolysis. These same sites, however, are those to which the reagent would bond in order to be activated. In aqueous media one, therefore, is faced with several problems. In order for the organic reactant to be activated, it must dissolve and be coordinated by the metal. In order to maintain the metal in solution, it must be coordinated by a solubilizing agent. This solubilizing agent must have sufficient affinity for the metal and/or be present in sufficient concentration so that it can displace water from the metal's coordination sphere. The organic reactant neither has sufficient affinity for the metal nor dissolves in sufficient amount to displace the solubilizing agent so activation is poor at best.

It is an object of the present invention, therefore, to provide stable, homogeneous solutions containing noble metal compounds. Another object is to provide such solutions having catalytic activity for a plurality of chemical reactions. Another object is to provide solutions of noble metal of atomic dimensions, thereby gaining more efficient use of such relatively expensive metals. A further object is to provide catalyst compositions possessing relatively long term use and storage stability, and not subject to poisoning by annealing. Still another object is to provide techniques for catalyst preparation which are relatively inexpensive and which do not require special equipment or critical processing control. Additional objects of the invention will be apparent from the following description.

In accordance with the present invention, therefore, there are provided stable, homogeneous solutions comprising:

(a) A compound of noble metal of Group VIII of Mendeleeff's Periodic Table, (b) A mono- or poly-hydric alcohol, and (c) From about 0.1 to about 12 percent by volume of water.

In the solutions or reagents contemplated herein, a compound of a noble metal of Group VIII of Mendeleeff's Periodic Table is used. Typical of such metals are: palladium, irridium, ruthenium, rhodium, platinum and osmium. The metals are used in the form of a metal compound. Anions associated with the metals can be of a wide variety, with halides being preferred. Catalytic amounts of metal compound will generally be from about 0.0001 to about 0.01 molar proportion with respect to the organic reactant or reactants employed.

Particularly preferred of the noble metal compounds is palladous chloride.

The noble metal compound is preferably used with a promoter capable of changing the valence of the reduced noble metal to a higher valence state, particularly in continuous operations. Representative is cupric chloride.

Others include such redox systems as compounds of metals having various oxidation stages, namely: compounds of copper, silver, tin, lead, cerium, mercury, nickel, iron, etc. Anions associated with the metals can be of wide variety including nitrates, acetates, and tetrafluoroborates, with preference being accorded to tetrafluoroborates and to halides and, particularly, to chlorides. Representative promoters include: cupric chloride, bromide, fluoride, tetrafluoroborate, trichloroacetate, acetate, citrate, acetylacetone, benzoate, ferrocyanide, and nitrate; cuprous iodide, thiocyanate, and cyanide; ferric and ferrous chlorides; mercuric chloride; cobaltous chloride; and silver acetate. The molar ratio of promoter to noble metal compound is from about 0.1:1 to about 100:1.

Suitable organic redox systems include the following, with a promoter being recited and its reduced counterpart being given parenthetically: benzoquinone (hydroquinone), o-benzoquinone (cathecol); and chloranil (tetrachlorohydroquinone).

It has also been found that vicinal diketones are particularly advantageous promoters. Typical of such diketones are 2,3-butanedione (diacetyl); 3,4-hexanedione; and 1,2-diphenylethanedione (benzil).

Thus, diketone promoters include vicinal diketones and diketones in which the keto groups are separated by a

group.

Particularly preferred are benzil and chloranil.

Compounds capable of oxidation to vicinal diketones are also useful as promoters. Such compounds are illustrated by: acetoin (which is oxidized to diacetyl); benzoin (which is oxdized to benzil); and ascorbic acid (which is oxidized to dehydroascorbic acid). Other promoters are 4-methoxycatechol and 4-tertiarybutyl catechol.

Concentration of vicinal diketone or its precursor ranges from about 1:1 to about 100:1, based upon the noble metal compound.

Iodine is also useful as a promoter.

Preferred promoters, however, are chlorides, bromides and iodides of metals of Groups VIII and I-B of Mendeleeff's Periodic Table, and cuprous chloride is particularly preferred.

Alcohols useful herein include monohydric or polyhydric and mixtures thereof. Primary, secondary and tertiary monohydric alcohols can be used. Representative alcohols include: methyl, ethyl, propyl, butyl, secondary butyl, isobutyl, tertiary butyl, pentyl, hexyl, benzyl and ethylene chlorohydrin. Polyhydric alcohols are typified by vicinal diols: ethylene glycol, propylene glycol, 2,3-butylene glycol, 3-chloropropanediol-1,2; homovicinal diols; propane-1,3; non-vicinal diols: hexanediol-1,6; other polyols; glycerine, pentaerythritol, sorbitol, sucrose, mannitol, 1,4-dihydroxymethyl benzene, 2-methyl-2,4-pentaediol, 1,1-dimethylol ethylene, 1,4-cyclohexane dimethanol, 2,2,4,4-tetramethylcyclobutane-1,3-diol, 2,2-propylidene bis (4-benzyl alcohol), 4,4-dimethylolcyclohexene.

As indicated above, water comprises from about 0.1 to about 12, and preferably 0.5-6, percent by volume of the solutions. Water can be added per se or can be present in part or whole with the alcohol or as water of hydration of noble metal compound and/or promoter. There is no need to use an anhydrous solution, as by using an anhydrous alcohol. The cost of removing the last traces of water from an alcohol is avoided therefore. Since water is known to be a stronger ligand than alcohol, it would be expected that even with trace amounts of water, a catalyst solution would resemble a catalyst formed with only water as the liquid medium rather than one formed with an anhydrous alcohol. Surprisingly, the catalyst solutions formed with an alcohol and 0.1-12 percent by volume have some of the characteristics of solutions formed with an anhydrous alcohol.

As demonstrated hereinafter, quantities of water greater than about 12 volume percent are disadvantageous. Preferred solutions are those in which the water content is between about 0.5 and about 6 percent by volume.

Advantages of the solutions containing 0.1-12 percent of water are illustrated by monohydric alcohol media and olefin oxidation. The olefin oxidation product is usually a free carbonyl compound, as a methyl ketone. In such an oxidation, there are a plurality of advantages. The ketone, rather than a corresponding ketal, is usually the desired product; and, it is advantageous to form the desired product directly, thereby avoiding the need for a separate ketal hydrolysis step. The ketone product can generally be separated readily from the olefin reaction mixture, while the corresponding ketal product is separated with greater difficulty. For example, in the oxidation of propylene in ethyl alcohol (boiling point, B.P., 78.4° C.), with water present, the product is the desired acetone (B.P., 56.5° C.), which is readily isolable from the aqueous ethanol mixture by distillation. In contrast, under anhydrous conditions, the product is 2,2-diethoxypropane (B.P., 114° C.), which cannot be isolated by distillation except by an uneconomical distillation of the entire solvent charge prior to product separation from the catalyst. Moreover, when the oxidation is carried out in the presence of 0.1-12 percent of water, to form carbonyl products, no water of reaction is formed. Consequently, it is not necessary to include a continuous dewatering step in the oxidation procedure:

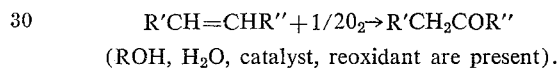

(ROH, H$_2$O, catalyst, reoxidant are present).

Under anhydrous conditions, however, formation of an acetal or ketal involves the concomitant formation of equimolar amounts of water, which must be removed promptly in order to maintain an anhydrous system:

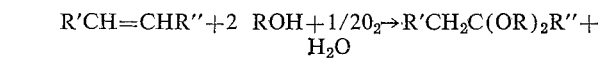

(Catalyst and reoxidant are present).

In the illustrative equations, R represents alkyl groups and R' and R'' represent hydrogen or alkyl groups.

It is surprising to find organic materials, i.e., alcohols, to have a greater solvent power for noble metal salts than water. For example, a methanolic solution 0.001 M in PdCl$_2$ and 0.002 M in LiCl remained clear for over 15 weeks. Even more concentrated solutions were similarly stable and furthermore the addition of small amounts of water to these solutions did not effect visible hydrolysis. Thus, methanolic solutions containing up to 10 volume percent water and 0.05 mole PdCl$_2$ per liter and 0.10 mole LiCl remained clear indefinitely while with 30 percent water, precipitation did not occur before 3 weeks. Of course, these methanolic solutions are excellent solvents for organic reactants so they present a priori an ideal combination of properties.

Not only do these lower alcohols constitute unique media for making homogeneous stable solutions of group VIII metals, but the resulting solutions are unique catalysts. Other organic media either do not dissolve Group VIII metals or their solutions are not catalytic. Known reactions in which alcoholic solutions of Group VIII metals are catalytic include: oxidation of ethylene to acyclic and alicyclic acetals; oxidation of higher olefins to acyclic and alicyclic ketals; oxidation of primary alcohols to aldehydes and esters; oxidation of secondary alcohols to ketones; and oxidation of benzenes to phenols. These reactions are described in related copending applications U.S. Ser. Nos. 391,005, filed Aug. 20, 1964; 474,460, 474,461 and 474,506, filed July 23, 1965; and 534,419, filed Mar. 15, 1966.

In addition, the alcoholic solutions or reagents of this invention are also advantageous catalytically for the oxidation of carbon monoxide to organic carbonates and of sulfur dioxide to organic sulfates. These oxidations are illustrated hereinbelow.

The utility of alcoholic solutions of Group VIII metal salts containing solubilizing agents can be further enhanced by selecting the solubilizing agent from the group consisting of easily oxidized materials, notably polyvalent metal salts and certain reducible bifunctional organics. These materials are reduced in preference to the Group VIII metal. Thus, for example, in the oxidation of ethylene by an alkali metal chloropalladate, for example lithium chloropalladate, according to:

(1)
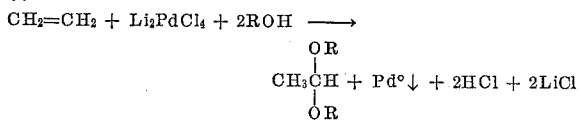

a precipitate of metallic palladium is formed. If, however, the alkali metal ion is replaced by a polyvalent ion such as, for example, cupric, then the latter is reduced instead. This may be represented as follows:

(2)
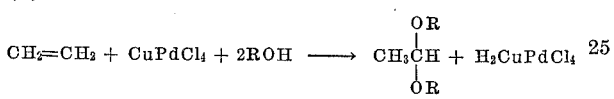

It is apparent that there has been no net reduction of palladium. Since the hypothetical product salts can exchange with additional cupric chloride according to:

(3)   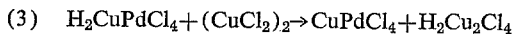

It is equally apparent that only a trace of noble metal is required.

Homogeneity is desirable not only from the point of view of catalyst efficiency but also because of the well known difficulties in handling heterogeneous media on an industrial scale. Not only are they difficult to transport but their heterogeneity per se complicates measurement and control.

The following examples are illustrative of the invention. However, it is to be understood that the invention is not to be construed as limited to the particular materials and conditions recited therein.

Example 1

Ethylene was reacted, in a glass vessel, in an alcoholic reagent solution containing approximately 0.5 percent by volume of water. Thus, 500 ml. of ethylene glycol containing water and 0.06 M in palladous chloride, was stirred for two hours at 50° C. under one atmosphere of ethylene, in the course of which palladium metal precipitated and plated on most of the glass surfaces. Analysis of the reaction mixture showed the formation of 15 mg.-moles (50 percent of theoretical) of 2-methyl-1,3-dioxolane, along with a very small amount of free acetaldehyde.

Example 2

Ethylene reacts readily with alcoholic palladous chloride at moderate temperatures, with or without the presence of a reoxidant or of molecular oxygen. Thus, 500 ml. of ethyl alcohol, 0.03 M in palladous chloride and 1.0 M in cupric nitrate trihydrate, was stirred for two hours at 50° C. under one atmosphere of ethylene. The water content of the alcoholic solution, by virtue of the water of hydration of the nitrate, is approximately 5.4 percent by volume. In the presence of the excess reoxidant, cupric nitrate, there was no deposition of metallic palladium, and the reaction mixture was found to contain 67 mg.-moles (about 450 percent of theoretical, basis palladium) of acetaldehyde diethyl acetal.

Example 3

The use of molecular oxygen and of moderate superatmospheric pressures accelerates greatly the oxidation of ethylene. Thus, a charge of 200 ml. of ethylene glycol, 0.028 M in palladous chloride and 0.586 M in cupric chloride dihydrate, on being stirred at 50° C., under a 2:1 ethylene/oxygen mixture at an initial pressure of 300 p.s.i.g., underwent a brisk exothermal reaction, the pressure falling to one atmosphere in thirty minutes. Water content of the alcoholic reagent is about 2.5 percent by volume. After forty minutes, the product mixture was found to contain 1.26 mg.-moles of 2-methyl-1,3-dioxolane along with 13 mg.-moles of free acetaldehyde. This higher conversion, notwithstanding the viscous glycol medium, shows that the regenerative reactions proceed efficiently, since this corresponds to a 2500 percent conversion based upon charged palladium, and a 216 percent conversion based upon combined palladium and copper salts.

Example 4

1,4-butanediol not only is a reactive alcoholic medium but also readily forms 7-membered ring products, that is, the 2-substituted 1,3-dioxepanes. Accordingly, 1.4-butanediol containing 0.028 M palladous chloride and 0.586 M cupric chloride dihydrate, on being stirred for forty minutes at 50° C. under (initially) 300 p.s.i.g. of a 2:1 ethylene/oxygen mixture, reacted smoothly to produce only a trace of free acetaldehyde along with 81 ml./liter of 2-methyl-1,3-dioxepane, identified by infrared spectrum and molar refraction. In a similar run with 1,5-pentanediol, a much smaller amount (1.6 ml./liter) of the 8-membered ring compound, 2-methyl-1,3-dioxocane, was obtained. With 1,6-hexanediol oxidation occurred, most probably to form high-boiling acyclic acetals. Only one small product peak (perhaps the 9-membered ring acetal, 2-methyl-1,3-dioxonane) was detectable at the upper temperature limits of the chromatographic analysis system which was used.

Example 5

In a glass shaker-reactor, with three atmospheres of oxygen, 20 volume percent of 1-octene (1.285 M) in n-propyl alcohol was converted to octanones in the presence of 0.02 M $PdCl_2$, and 0.1 M $CuCl_2.2H_2O$. Water present with the alcohol and in the form of water of hydration of the cupric chloride, constituted approximately 0.6 percent by volume of the reagent solution. Reaction was carried on for two hours. The product was analyzed by vapor phase chromatography, which indicated that the yields were as follows: 67.5 percent 2-octanone, 8.9 percent 3-octanone and 2.7 percent 4-octanone, based on all octanones formed. This corresponds to conversions of 1-octene to 85 percent 2-octanone, 11 percent 3-octanone and 3.5 percent 4-octanone.

Example 6

Styrene was oxidized at a 0.723 M solution in a variety of alcohols containing $PdCl_2$ 0.02 M, $CuCl_2$ 0.04 M and $Cu(NO_3)_2$ 0.06 M, for two hours at 30° C. under three atmospheres oxygen pressure. Water content of the alcoholic reagent solution, in each instance, was approximately 0.7 percent by volume. The conversions of styrene in methyl, ethyl, n-propyl and n-butyl alcohols were 71 percent, 68 percent, 32 percent and 25 percent, respectively. The ratio of acetophenone to phenyl-acetaldehyde (occurring primarily as the corresponding acetal), in these mixed chloride-nitrate systems remainded close to 1.2 for all four systems, while the amount of side-reaction to form benzaldehyde was only 5 percent with methyl alcohol but 18 percent with ethyl alcohol. If both acetophenone and phenyl-acetaldehyde are counted as product, the yields for the four alcohols, in order of increasing chain length are 95 percent, 82 percent, 91 percent and 96 percent. The conversion-yield products are 67 percent, 56 percent, 29 percent and 24 percent, respectively. For this series, therefore, on the basis of conversions and yields in these very mild styrene oxidations at 30° C., methyl alcohol is preferred over the other alcohols.

Example 7

3-chloropropanediol (obtained by hydrolysis of epichlorohydrin) reacts to give the corresponding 2-substituted-4-chloromethyl-1-1,3-diozolanes, of interest as chemical intermediates. To 20 ml. of a solution of 0.5 M $CuCl_2$ and 0.5 M $Cu(BF_4)_2$ in 3-chloropropanediol were added 5.0 ml. styrene and 1.0 mg.-mole palladous chloride. Water content of the alcoholic reagent solution was about 8 percent by volume. The resulting mixture was shaken well and allowed to stand overnight at 53° C., whereupon most of the styrene was found to have been converted to 2-methyl-2-phenyl-4-chloromethyl-1,3-dioxolane, isolated as the major product (77 percent yield) along with some free acetophenone (6 percent) and a secondary product believed to be the isomeric 2-benzyl-4-chloromethyl-1,3-dioxolane (14 percent yield).

Example 8

20 milliliters (ml.) of acrylonitrile and 100 ml. of methyl alcohol were added to 1.8 grams (0.01 mole) of palladous chloride and 1.98 grams (0.015 mole) of cupric chloride dihydrate in a stirred, stainless steel autoclave of 250 ml. capacity. The clave was pressured to 100 p.s.i.g. with oxygen, heated to 100° C. and maintained at that temperature for three hours, with continuous stirring and with several oxygen additions to maintain pressure. The water content of the charge to the clave exclusive of the acrylonitrile was approximately 1.5 percent by volume. After cooling the reaction mixture, it was filtered to remove inorganic solids therefrom. The remaining liquid reaction mixture was analyzed on a preparative gas chromatograph (Wilkens Aerograph Model A–700), using a ten percent Carbowax 20M column (20' x ⅜") at 140° C., with a helium flow rate of 140 ml./min. Under these conditions, a single major product was obtained; this represented about 90 percent of all products. Infrared analysis, elemental analysis ($C_5H_9O_2N$), boiling point (capillary method) of 195° C. at 764 mm., refractive index ( white light at 25.0° C.) of 1.4122± 0.0001, density at 25° C. of 1.011±0.005, mass spectrometric analysis, and nuclear magnetic resonance spectroscopy, all taken together indicate that the product is cyanoacetaldehyde dimethyl acetal.

Example 9

0.35 gram of $PdCl_2$ and 0.85 gram of $CuCl_2.2H_2O$ were added to 10 ml. of acrylonitrile. The resulting mixture was diluted to 50 ml. with reagent ethylene glycol in a 250-ml. capacity stainless steel bomb. The bomb was sealed, purged with oxygen, and pressured to 30 p.s.i.g. with oxygen. The bomb was heated, while shaken, to 85° C. and was so maintained for a two-hour period, during which time a pressure drop of 12 p.s.i.g. was recorded. The reaction mixture was cooled, and was discharged from the bomb by decanting clear liquid from a precipitate of inorganic salts.

The water content of the charge to the bomb exclusive of acrylonitrile, was approximately 3.8 percent by volume.

The liquid product was analyzed with a F&M Model 720 gas chromatograph, using an eight-foot analytical ethylene glycol succinate column at 150° C. The chromatograms showed an extremely clean reaction implying a near-quantitative yield, with a single peak appearing at 13.4 minutes for analytical samples, and 13.5 to 15.0 minutes for larger samples. The amounts of reaction product in this run, based upon integrated areas of the chromatograms, is 6.2 percent by weight. Infrared analysis and elemental analysis ($C_5H_7O_2N$) indicate that the product is 1,3-dioxolane-2-acetonitrile, namely:

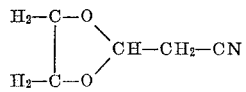

Example 10

1,3-propanediol (40 ml.) and acrylonitrile (10 ml.) were mixed in a 300-ml., glass reactor (a Parr Low Pressure Hydrogenation Apparatus) together with palladous chloride (0.35 gram) and cupric chloride dihydrate (0.85 gram). The reaction charge, excluding the acrylonitrile, had a water content of about 2.5 percent by volume. The resulting mixture was heated for three hours at 100° C., with continual shaking and at a pressure of 25–35 p.s.i.g. of oxygen. Upon cooling to about 20° C.–25° C., the resulting homogeneous reaction mixture was found to contain, unreacted glycol, about 25 percent of unreacted acrylonitrile and a single product identified as 1,3-dioxane-2-acetonitrile. Identification was made by elemental analysis, infrared spectrum and refractive index ($n_D^{25}$), 1.4462. Conversion was approximately 75 percent.

Example 11

Cyclohexene is oxidized readily by palladous salts in monohydric alcohols to cyclohexanone, and in dihydric alcohols to the corresponding spiroketal. With four volumes of ethyl alcohol, 0.028 M $PdCl_2$ and 0.117 M $CuCl_2.2H_2O$ at 30° C. for two hours, cyclohexene underwent a 12 percent conversion to cyclohexanone, with no other products detectable. Water content of the charge, exclusive of cyclohexene, was about 0.7 percent by volume. Similarly, with four volumes of ethylene glycol and five volumes of 1,4-dioxane (as a neutralizing solvent and thinner), cyclohexene in two hours at 50° C. with the same catalyst system containing about 0.4 percent by volume of water, underwent a 10 percent conversion to the ketal, 1,4-dioxaspiro (4.5) decane, with no side products detectable. In a similar run with 1,3-propanediol containing about 5 percent by volume of water, cyclohexene was oxidized to a mixture of 1 part cyclohexanone and 3 parts 1,5-dioxaspiro (5.5) undecane.

Example 12

Organic compounds of certain categories may also be used as reoxidants. Cyclohexene was oxidized in ethyl alcohol with a variety of organic reoxidants. Reaction was caired out for two hours at 50° C. in a glass shaker-reactor under three atmospheres of oxygen pressure. Cyclohexene constituted 20 percent in ethyl alcohol, 0.02 M in $PdCl_2$. The concentration of reoxidant was 0.1 M. Water content exclusive of cyclohexene was approximately 0.3 percent by volume. In Table I following, the quantity of cyclohexanone formed is given in a number of volumes per 100 volumes of olefin charge.

TABLE I

| Run No. | Reoxidant | Cyclohexanone Formed, Vols./100 Vols. Cyclohexene |
| --- | --- | --- |
| 94 | Acetoin | 11 |
| 96 | Copper Acetylacetonate, $Cu(C_5H_7O_2)_2$ | 13 |
| 98 | Benzil | 13 |
| 108 | 1,4-naphthoquinone | 2.5 |

Example 13

The effect of water content is shown by several runs with n-propyl alcohol in a moderate pressure glass shaking reactor at 90° C. for two hours. n-Propyl alcohol was used with 0.02 M $PdCl_2$ and 0.1 M $Cu(NO_3)_2.3H_2O$, with three atmospheres of oxygen.

As shown in the following tabulation, reaction of the alcohol to form propionaldehyde and n-propyl propionate is inhibited markedly by employing relatively large amounts of water.

| Water Content, Percent by Vol. | Propionaldehyde, moles/kg. | | | n-Propyl propionate, moles/kg. |
| --- | --- | --- | --- | --- |
| | Total | As acetal | Net total | |
| 0.8 | 0.40 | 0.65 | 1.05 | 0.083 |
| 10.8 | 0.24 | 0.14 | 0.38 | 0.013 |
| 30.8 | 0.005 | <0.005 | 0.005+ | <0.005 |

Example 14

The effect of water content upon the oxidation of cyclohexene to cyclohexanone at 50° C. in ethyl alcohol is shown in Table II given below.

TABLE II

| Run [a] | Water Content Charge Less Cyclohexene (by Karl Fischer), Percent Vol. | Percent Cyclohexene Reacted | Percent Cyclohexanone Formed [c] |
|---|---|---|---|
| 219 | 2.8 | 88 | 58 |
| 220 | 11.9 | 48 | 38 |
| 222 | [b] 36.5 | 20 | 15 |
| 223 | [b] 67 | 7.2 | 3.2 |

[a] Two hour runs in glass shaker-reactor under 3 atmospheres of oxygen, with $PdCl_2$ 0.02 M and $CuCl_2$ 0.1 M; each run 5 ml. of cyclohexene, water as indicated, and ethanol q.v. 50 ml.
[b] Reaction mixture contained two phases; assays made upon both phases.
[c] Basis: Total olefin charged.

Example 15

Neopentyl alcohol (2,2-dimethyl-1 propanol) is oxidized readily at 90° C. for two hours in the reactor identified in Example 11, under three atmospheres of oxygen, with $PdCl_2$ 0.02 M and $Cu(NO_3)_2 \cdot 3H_2O$ 0.1 M. Water content of the materials charged to the reactor was approximately 0.8 percent by volume. Formed in this reaction was a mixture containing 1.4 moles/kg. of pivalic aldehyde and 0.3 moles/kg. of a new compound, pivalic aldehyde dineopentyl acetal. The latter is characterized by: $n_D^{25}$ 1.4092; $d_4^{22}$ 0.803; Mr-calculated 74.76, found 75.27. Another product, most probably neopentyl pivalate, was formed in an amount of 0.02 mole/kg.

Example 16

A solution of 10 volume percent benzene in ethylene glycol was charged to an autoclave. Palladium chloride (7 grams/liter) and $CuCl_2 \cdot 2H_2O$ (17 grams/liter) were added. Exclusive of benzene, the materials charged to the autoclave contained about 0.9 percent by volume of water. The autoclave was heated for one hour at 110° C., under a pressure of 3–6 atmospheres of oxygen. The autoclave was cooled and the resulting reaction product was discharged therefrom. Phenol was recovered from the reaction product in a yield in excess of about 80 percent by weight, at a conversion of about two percent per pass based upon benzene charge.

Example 17

Secondary butyl alcohol is oxidized to methyl ethyl ketone as the sole product, when employed in the reactor identified in Example 11 for two hours. Here again, the charge to the reactor included $PdCl_2$ 0.02 M, $$Cu(NO_3)_2 \cdot 3H_2O$$

0.1 M, and three atmospheres of oxygen. Water content was 0.8 percent by volume. At temperatures of 70° C., 90° C. and 110° C., the yield was 0.39, 0.74 and 1.2 moles/kg., respectively.

In contrast, under identical conditions at 70° C., 80° C. and 90° C., tertiary butyl alcohol was completely unreactive.

Under conditions identical with those used for secondary butyl alcohol at 90° C., cyclohexanol was converted to cyclohexanone (0.23 mole/kg.) as the sole product.

Example 18

As indicated above, aqueous alcohols are unusually effective as organic media for the catalyst or reagent systems contemplated herein. For example, benzonitrile has been found to be an ineffective solvent-medium for the oxidation of cyclohexene. The catalyst composition comprises $PdCl_2$ 0.02 M and $CuCl_2 \cdot 2H_2O$ 0.1 M, and has a water content of about 0.3–0.5 percent by volume. Similar conversions were tried at 50° C. with a variety of other non-alcoholic media. No significant reaction occurs when the solvent medium is dioxane, acetic acid, dimethyl sulfoxide, dimethyl formamide, propylene carbonate, chlorobenzene or carbon tetrachloride.

Quantitative data is set out in Table III below.

TABLE III.—OXIDATION OF CYCLOHEXENE BY PALLADIUM (II) IN NON-ALCOHOLIC MEDIA [a]

| Run | Solvent Medium | Conversion of Cyclohexane to Cyclohexanone |
|---|---|---|
| 147 | Benzonitrile [b] | 0.4 |
| 235 | 1,4-dioxane | 1.2 |
| 236 | Carbon Tetrachloride | <0.5 |
| 237 | Chlorobenzene | <0.5 |
| 238 | Dimethyl Sulfoxide | <0.5 |
| 239 | N,N-dimethylformamide | <0.5 |
| 240 | Acetic Acid | <0.5 |
| 241 | Propylene Carbonate | <0.5 |
| (232 | Ethyl Alcohol | 30) |

[a] Two hour oxidations in a glass shaker-reactor under 3 atmospheres oxygen pressure; 10 volume percent (0.985 M) cyclohexene in the indicated solvent, with $PdCl_2$ 0.02 M and $CuCl_2 \cdot 2H_2O$ 0.1 M, reacted at 50° C.
[b] At 30° C.

Example 19

Alcohols are much more advantageous than water with respect to the formation of stable solutions of $PdCl_2$. This is indicated in Table IV below.

TABLE IV.—SOLUTION STABILITIES OF $PdCl_2$ IN METHYL ALCOHOL—WATER SYSTEMS [a]

| Vol. Percent | | 3 Hrs. | 2 Days | 5 Days | 21 Days | 105 Days | 222 Days |
|---|---|---|---|---|---|---|---|
| $H_3COH$ | $H_2O$ | | | | | | |
| *$PdCl_2$ 0.05 M and LiCl 0.1 M* | | | | | | | |
| Nil | 100 | OK | OK | OK | OK | PPT | |
| 70 | 30 | OK | OK | OK | OK | PPT | |
| 90 | 10 | OK | OK | OK | OK | OK | OK |
| 96 | 4 | OK | OK | OK | OK | OK | OK |
| 98 | 2 | OK | OK | OK | OK | OK | OK |
| 99 | 1 | OK | OK | OK | OK | OK | OK |
| 100 | [b] Nil | OK | OK | OK | OK | OK | OK |
| *$PdCl_2$ 0.1 M and LiCl 0.02 M* | | | | | | | |
| Nil | 100 | OK | PPT | | | | |
| 70 | 30 | OK | OK | PPT | | | |
| 90 | 10 | OK | OK | OK | PPT | | |
| 96 | 4 | OK | OK | OK | OK | OK | OK |
| 98 | 2 | OK | OK | OK | OK | OK | OK |
| 99 | 1 | OK | OK | OK | OK | OK | OK |
| 100 | [b] Nil | OK | OK | OK | OK | OK | OK |
| *$PdCl_2$ 0.001 M and LiCl 0.002 M* | | | | | | | |
| Nil | 100 | PPT | | | | | |
| 70 | 30 | OK | PPT | | | | |
| 90 | 10 | OK | Trace | PPT | | | |
| 96 | 4 | OK | Trace | Trace | Trace | PPT | |
| 98 | 2 | OK | OK | OK | Trace | Trace | PPT |
| 99 | 1 | OK | OK | OK | Trace | Trace | PPT |
| 100 | [b] Nil | OK | OK | OK | OK | OK | OK |

[a] All solutions were stored in clear borosilicate glass bottles tightly capped and away from direct sunlight, at ambient temperature (about 28° C. at all times). "OK" signifies a stable solution; "PPT" signifies a precipitate has formed.
[b] This methyl alcohol contained approximately 0.1% (by volume) of water, and when the salts were dissolved therein contained 0.1–0.2% of water.

EXAMPLE 20

Palladous salts, for example, $PdCl_2$, dissolved in alcohols, are actually different from similar solutions in water. This can be shown not only "functionally," as with the examples given above, but in terms of the most basic measurements on the molecular level, namely, absorption spectra.

Ultraviolet and visible spectra of dilute samples of palladous chloride solutions were obtained with a Beckman Model DK–2 recording spectrophotometer, using a fast scan with a 1.000-cm. quartz cell, and the output signal being balanced against that from a matched reference cell containing aqueous methanol of the same composition. Results of these spectrophotometric determinations are shown in Table V below.

TABLE V.—ULTRAVIOLET AND VISIBLE ABSORPTION MAXIMA OF DILUTE SOLUTIONS OF PALLADOUS CHLORIDE [a]

| H$_2$O in Aqueous H$_3$COH | | First Maximum | | Second Maximum | | Third Maximum | |
|---|---|---|---|---|---|---|---|
| Vol. Percent | Mole Percent | λmax. | ε | λmax. | ε | λmax. | ε |
| 100 | 100 | 202 | >6.2×10$^3$ | 303 | >310 | 418 | >180 |
| 30 | 49 | | | 314 | >640 | 422 | >200 |
| 10 | 20 | | | 318 | >790 | 427 | >260 |
| 4.0 | 8.6 | | | | | 429 | 250 |
| 2.0 | 4.4 | 222 | 7.3×10$^3$ | | | 431 | 290 |
| 1.0 | 2.2 | 210 | 9.1×10$^3$ | | | 431 | 260 |
| Nil | ~0.1 | 213 | 1.9×10$^4$ | 323 | 1.1×10$^3$ | 434 | 260 |

[a] Measurements at 26° C. with aqueous methyl alcohol of matching composition in the reference cell, maximum concentrations of PdCl$_2$ 0.02 percent weight/volume and 0.008 percent weight/volume of LiCl; wavelength maxima in millimicrons; extinction coefficients calculated as the quotients of the negative logarithm of transmittance and the molarity, i.e., $$\epsilon = \frac{-\log_{10}(1\text{-cm. cell transmittance})}{(\text{PdCl}_2 \text{ conc. in moles/liter})}$$

The data given above show three strong maxima associated with aqueous-solvated palladous chloride, at 202, 303, and 418 millimicrons. All three maxima display bathochromic shifts of 110–220 Angstrom units as the aqueous medium is replaced by a methyl alcohol medium, that is, as the solute species changes from hydrated palladium (II) chloride to methyl alcohol-solvated palladium (II) chloride. This consistent bathochromic shift in going from hydrated palladium (II) to methanol-solvated palladium (II) is most resonably interpreted as denoting a decrease in the metal-to-ligand binding energy. In terms of gross chemical behavior, this implies that alcohol-solvated palladium (II) is more "bare," more susceptible to attack by a ligand of moderate activity, and hence more chemically reactive than the more strongly solvated aquopalladium (II) complexes.

This reasoning is supported by comparative efficiencies of palladium (II)-catalyzed oxidations of olefins in alcohol and in water under parallel conditions as shown in Table VI below.

and 65 percent cyclohexane. In the parallel oxidation with ethanol, however, not only did the desired oxidation proceed much more rapidly, but the disproportionation of olefin was sharply inhibited, residual hydrocarbon consistent of 75 percent cyclohexene, 13 percent benzene and 12 percent cyclohexane. Acrylonitrile, one of least reactive olefins studied, reacted smoothly in methyl alcohol at 85° C. to afford a 40 percent conversion to the dimethyl acetal of cyanoacetaldehyde; but a parallel oxidation attempted in water gave no product discernible by chromatographic examination. One of the most reactive olefins, ethylene, reacts readily in 40 minutes at 50° C. in alcoholic or aqueous systems; in glycol, however, the ethylene is completely consumed in this period, while in water under parallel conditions only 25 percent of the charged ethylene is reacted. Furthermore, since the product from the oxidation in glycol is a stable compound, 2-methyldioxolane, it is not necessary that it be removed as formed. Under these static conditions wherein product is subjected to conditions fostering various secondary reactions, only 19 percent of the original acetaldehyde formed in the aqueous reaction is collected as acetaldehyde; while the yield of 2-methyldioxolane from the parallel run in glycol is over 96 percent. The foregoing data indicate the olefin reaction rates to be generally much higher in alcoholic media than in water.

The effects of water upon the alcohol-solvated palladium (II) oxidizing system are in general colligative. Added water may affect the product balance, and at levels as high as 12 percent will adversely affect oxidation reaction rate. Homogeneity of the alcohol systems, another distinct advantage over aqueous systems, is not likely to be impaired by the presence of small amounts of water.

Example 21

2,5-dihydrofuran is oxidized readily to give the corresponding ketal of 3-oxotetrahydrofuran. Thus, an 8.3% (v./v.) solution of dihydrofuran in ethyl alcohol containing 0.02 M PdCl$_2$ and 0.1 M CuCl$_2$ reacted for two hours at 50° C. under oxygen, underwent a 97% conversion. The water content, exclusive of dihydrofuran, is about 0.6 percent by volume. The yield of 3,3-diethoxy- TABLE VI.—COMPARATIVE EFFICACIES OF PALLADIUM (II)—CATALYZED OLEFIN OXIDATIONS IN ALCOHOL AND IN WATER [a]

| Run No. | Olefin | Volume Percent Diluent | T., °C. | PdCl$_2$, M | CuCl$_2$, M | Products Formed | | Conversion in Alcohol, Percent [d] | Conversion in Water, Percent |
|---|---|---|---|---|---|---|---|---|---|
| | | | | | | Carbonyl Product | Alcohol | | |
| 205–6 | 1-octene | 50 | 50 | 0.02 | 0.1 | Octanone | Methyl | 48.8 | 1.7 |
| 207–8 | ...do | 80 | 30 | 0.018 | 0.1 | ...do | ...do | 63 | 2.5 |
| 209–10 | ...do | 80 | 60 | 0.018 | 0.1 | ...do | ...do | 72 | 4.5 |
| 211–12 | Cyclohexene | 90 | 50 | 0.2 | Nil | Cyclohexanone | Ethyl | 22 | 1.7 |
| 213–14 | ...do | 80 | 50 | 0.02 | 0.1 | ...do | ...do | 52 | 0.13 |
| 215–16 | Acrylonitrile | 90 | 85 | 0.04 | 0.03 | Cyanoacetaldehyde | Methyl | [b] 40 | ([e]) |
| 18–18 | Ethylene [c] | | 50 | 0.04 | 0.4 | Acetaldehyde | Ethylene glycol | 100 | 21 |

[a] Two hour runs in glass shaker-reactor under 3.0 atmospheres of oxygen, except as noted otherwise.
[b] As cyanoacetaldehyde dimethyl acetal (no other product discerned).
[c] 40 minute runs in stirred autoclave charged with 240 p.s.i. ethylene and 75 p.s.i. oxygen.
[d] Water content of the alcohol, PdCl$_2$ and CuCl$_2$ system, approximately 0.6% by volume.
[e] None detectable.

Under various conditions, 1-octene is oxidized in methanol to octanone in conversions of 42–72 percent, while under parallel conditions in water the conversions are all less than 5 percent. Indeed, with the conditions permitting conversions in water as high as 5 percent, the formation of side products was noticeable. Cyclohexene is oxidized to cyclohexanone under model conditions to the extent of 52 percent in ethyl alcohol, and less than 1 percent in a parallel aqueous reaction. In the absence of a cupric reoxidant, 22 percent of the charged cyclohexene is oxidized by Pd(II) in ethyl alcohol, while less than 2 percent is converted in a parallel aqueous reaction. In this latter pair of reactions, furthermore, the reduced zero-valent palladium metal, a powerful disproportionation catalyst, tends to convert cyclohexene to a mixture of cyclohexane and benzene. In the aqueous oxidation, the unreacted hydrocarbon contained no cyclohexene at all; its composition by gas chromatographic analysis was 35 percent benzene furan was 94%, and the yield of 3-ethoxy-2,5-dihydrofuran was less than 1%.

3,3-diethoxyfuran is the stable fletal of tetrahydrofuran (dihydro-3(2H)-furanone) is useful as an intermediate in the synthesis of pyridoxine (Vitamin B–6).

Example 22

Styrene was reacted at 70° C. by adding 1.3 millimoles thereof to 5 ml. of warm ethylene glycol-catalyst solution. The solution contained 0.03 M PdCl$_2$, 0.5 M CuCl$_2$ and 0.5 M Cu(BF$_4$)$_2$ and 8 percent by volume of water. Styrene is so oxidized to 2-benzyl-1,3-dioxolane (phenylacetaldehyde ethylene acetal, "odor of roses") in a yield of 90%. Acetophenone is formed as a co-product. The combination of CuCl$_2$ and Cu(BF$_4$)$_2$ was much more effective than either CuCl$_2$ or Cu(BF$_4$)$_2$ individually in this reaction.

Example 23

To 200 ml. ethyl alcohol containing 5.00 g. palladous nitrate, an excess of sulfur dioxide was stirred in, to saturate the alcohol to 30 p.s.i. Water content of the reaction mixture, exclusive of $SO_2$, was approximately 0.3 percent. The reaction mixture was then warmed to 50° and stirred at the temperature for 60 minutes. The mixture was then cooled, the excess surfur dioxide vented, and the liquid phase collected and analyzed by gas chromatography. A single product was found, namely, diethyl sulfate, identified by the exact matching of its residence times on two different columns (polyphenyl ether, 20' x ⅜" at 175° C., and apiezon L, 8' x ¼" at 100° C.) with authentic reagent diethyl sulfate. The amount of diethyl sulfate found was 6.5 g./liter, corresponding to a 39% conversion, based upon charged palladium salt.

Example 24

To 150 ml. of reagent anhydrous ethyl alcohol was added 3.47 g. palladium (II) nitrate (0.100 mole/liter). Water content of the mixture was approximately 0.2 percent. The mixture was stirred in a glass gas-sparging tower. A steady trickle of carbon monoxide gas (about 10 ml./min.) was passed through the stirred mixture for three hours at room temperature (26° C.), in the course of which time a palladium mirror developed on the walls of the vessel. Analysis of a liquid sample showed the formation of less than 0.05% of diethyl carbonate. The mixture was then warmed to 50° C. by means of infrared lamps and the carbon monoxide trickle was continued for two hours, whereupon the mixture was analyzed. The major product, formed to the extent of 0.30% of the total mixture (25% conversion based on the total palladium salt charged), was diethyl carbonate, identified by vapor phase chromatography.

Example 25

50 ml. of an ethylene glycol solution containing 0.025 M $Pd(NO_3)_2$ and 0.125 M $Cu(NO_3)_2 \cdot 3H_2O$ were heated to 60° C. for two hours under 3–3.5 atmospheres (absolute) pressure of carbon monoxide (CO), and with continuous agitation. Water content of the reaction mixture exclusive of CO was about 1.2 percent. The resulting reaction mixture was then cooled and analyzed chromatographically. A quantitative conversion to 0.15 M of ethylene carbonate was obtained. No side product was detected.

It is to be understod that many modifications may be made within the scope of the present invention without departing from the spirit thereof, and the invention is intended to include all such modifications.

I claim:
1. A stable, homogeneous solution comprising:
   (a) a compound of a noble metal of Group VIII of Mendeleeff's Periodic Table, having a concentration of metal ion between about 0.01 and 0.0001 mole per liter; and
   (b) a major amount of an aqueous mono- or poly-hydric alcohol containing
   (c) from about 0.1 to about 12 percent by volume of water.
2. A solution defined by claim 1 containing a promoter having an oxidation potential sufficient to change the valence of the reduced noble metal to a higher valence state, the promoter being present in an amount of between about 0.1 mole to about 100 moles per mole of noble metal ion.
3. A solution defined by claim 2 wherein the promoter comprises $Cu(BF_4)_2$.
4. A solution defined by claim 2 wherein the promoter is selected from the group consisting of chlorides, bromides and iodides of a metal of Groups VIII or I–B of Mendeleeff's Periodic Table.
5. A solution defined by claim 4 wherein the promoter comprises cupric chloride.
6. A solution defined by claim 2 wherein the promoter comprises cupric nitrate.
7. A solution defined by claim 1 wherein compound (a) is palladous chloride.
8. A solution defined by claim 1 wherein the alcohol (b) is methyl alcohol.
9. A solution defined by claim 1 wherein the alcohol (b) is ethylene glycol.
10. A solution defined by claim 2 wherein the promoter comprises cupric trichloroacetate.

References Cited

UNITED STATES PATENTS

| | | | |
|---|---|---|---|
| 3,106,579 | 10/1963 | Hornig et al. | 252—429 XR |
| 3,119,874 | 1/1964 | Paszthory et al. | 252—429 XR |
| 3,119,875 | 1/1964 | Steinmetz et al. | 252—429 XR |
| 3,121,673 | 2/1964 | Riemenschneider et al. | 252—429 XR |
| 3,122,586 | 2/1964 | Berndt et al. | 252—429 XR |

PATRICK P. GARVIN, *Primary Examiner.*